G. F. FOSS.
CAP FOR VALVE STEMS FOR PNEUMATIC TIRES.
APPLICATION FILED DEC. 5, 1908.
958,867.
Patented May 24, 1910.
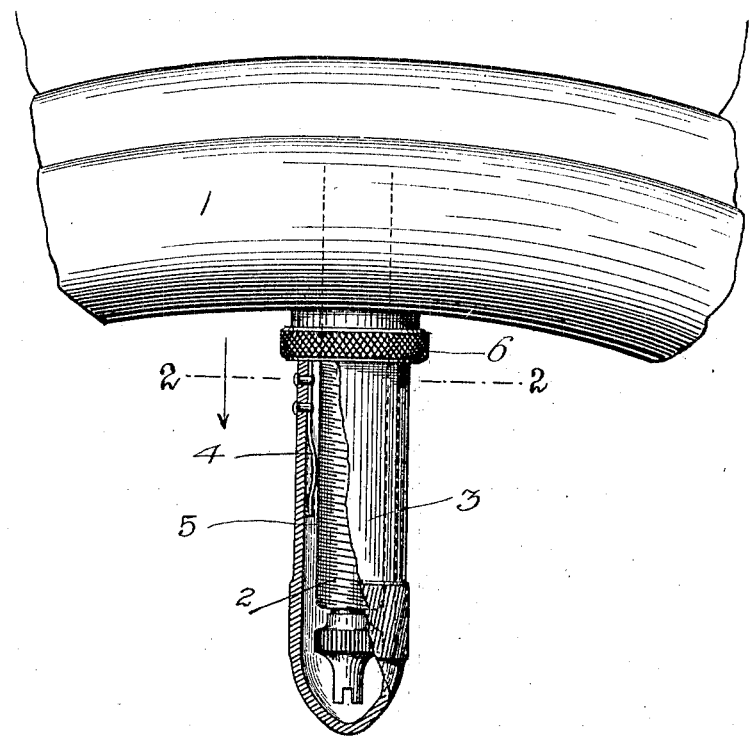
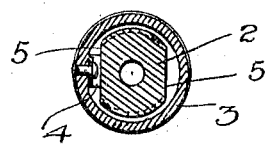
Witnesses,
Inventor,
George F. Foss,

UNITED STATES PATENT OFFICE.

GEORGE F. FOSS, OF LOS ANGELES, CALIFORNIA.

CAP FOR VALVE-STEMS FOR PNEUMATIC TIRES.

958,867.  Specification of Letters Patent.  Patented May 24, 1910.

Application filed December 5, 1908. Serial No. 466,090.

*To all whom it may concern:*

Be it known that I, GEORGE F. Foss, a citizen of the United States, residing at Los Angeles, in the county of Los Angeles and State of California, have invented new and useful Improvements in Caps for Valve-Stems for Pneumatic Tires, of which the following is a specification.

My invention consists in providing the valve stem cap with resilient means to prevent its accidental displacement when in place on the valve stem, and to provide means whereby it can be readily removed from or replaced on the valve stem. I accomplish this object by means of the valve stem described herein and shown in the accompanying drawings, in which:—

Figure 1 represents a fragment of the felly and outer casing of a wheel equipped with a pneumatic tire, the valve being in place thereon, a portion of the valve cap being broken away for purposes of illustration. Fig. 2 is a transverse section looking downwardly on the line 2—2 of Fig. 1.

In the drawings, 1 represents a fragment of the felly of a wheel having a pneumatic tire to which is secured the valve stem 2. This stem is inclosed by the valve cap 3, which is provided with a friction spring 4 projecting outwardly from the inside of the cap and contacts with the valve stem and holds the cap in frictional engagement with the valve stem. I have provided on either side of the valve stem a cut-away portion, as at 5, providing thereby a flat bearing surface along which the friction spring 4 can be easily moved by force, but will not move otherwise.

Heretofore in all valve caps of which I am aware, the cap has been screwed upon the valve stem from its outer end until it contacts with the knurled thumb nut 6 which holds the valve stem in air tight contact with the inner casing (not shown). By this construction I obviate the difficulty and save the time necessary to thus screw the cap onto the valve stem.

Owing to the centrifugal force imparted to the cap by the rapid revolution of the wheel the cap is always kept in place and in contact with the knurled nut and I find by experience that any screw-threaded engagement of the cap with the stem is unnecessary. By this construction it will be seen that the valve cap can be instantly placed on and removed from the valve stem without any screwing which requires time and exhausts men's patience.

Having described my invention what I claim as new and desire to secure by Letters Patent is:—

In a valve stem for pneumatic tires, the combination of a valve stem provided with a flat bearing face, of a cover therefor, a spring mounted on the inner face of the cover and projecting therefrom, said spring adapted to contact with the bearing face formed on the stem to maintain the cover in spring tight frictional engagement with the valve stem.

In witness that I claim the foregoing I have hereunto subscribed my name this 25th day of November, 1908.

G. F. FOSS.

Witnesses:
HENRY T. HAZARD,
EDMUND A. STRAUSE.